Figure 1:
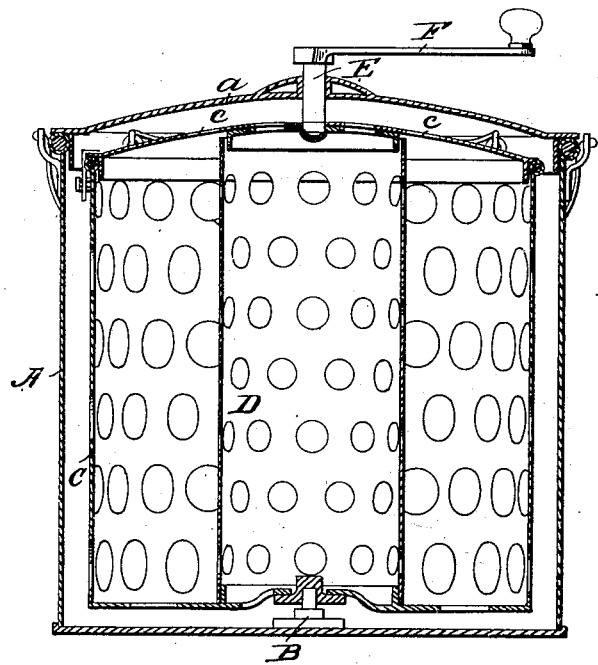

C. M. LELAND.
MACHINE FOR WASHING DISHES, KNIVES AND FORKS, &c.

No. 92,323. Patented July 6, 1869.

United States Patent Office.

CHARLES M. LELAND, OF CENTRAL CITY, COLORADO TERRITORY.

Letters Patent No. 92,323, dated July 6, 1869.

IMPROVED MACHINE FOR WASHING DISHES, KNIVES AND FORKS, &c.

The Schedule referred to in these Letters Patent and making part of the same.

*To all whom it may concern:*

Be it known that I, CHARLES M. LELAND, of Central City, in the county of Gilpin, Territory of Colorado, have invented a new and useful Machine for Washing Dishes, Knives, Forks, Spoons, and other Articles; and I do hereby declare that the following is a full, clear, and exact description thereof, reference being had to the accompanying drawings, and to the letters of reference marked thereon.

The nature of my invention consists in providing an apparatus for washing dishes, by passing them swiftly through boiling-hot water, and afterwards drying them by heat, dispensing with wiping.

To enable others skilled in the art to make and use my invention, I will proceed to describe its construction and operation.

I provide a cylindrical kettle, of suitable size, with a removable lid.

In the centre of the bottom of this kettle is a pinion, on which revolves a cylinder or crate, for the reception of dishes, perforated on all sides, and somewhat smaller than the kettle.

The crate has a lid, also perforated, with a pin fastened to it in the centre, pointing upward, and passing through a hole in the lid of the kettle.

On this pin fits a crank, by which the crate is turned. For the reception of knives, forks, and spoons, another smaller, perforated cylinder is inserted in the middle of the crate, and fastened to its bottom.

In the drawings—

Figure 1 represents a vertical section of the dish-washer in full rig.

Figure 2:
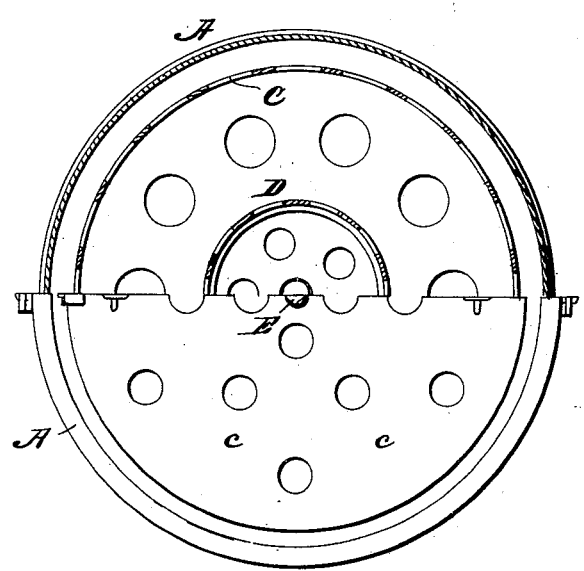

Figure 2, a half horizontal section and a half plan, with the crank and lid of the kettle removed.

Like letters denote like parts.

A is the kettle for the reception of the water.

a, the lid to it.

B, the pinion on which revolves the crate C, with the lid c c and the inner perforated cylinder D.

F, the crank, which turns the crate C, by the pin E.

Its operation is as follows:

The crank and the lid of the kettle are removed. The crate is then lifted out of the kettle, opened, and filled with dishes, standing them on their edges around the sides, in rows, in such a manner that the rows break joints.

The smaller perforated cylinder is filled with knives, forks, and spoons. The crate is now closed, and the lid secured by a bolt.

In the meanwhile, a sufficient quantity of water, with some soft soap, has been heated in the kettle.

The crate is now placed in it, resting on the pinion. The boiling-hot water at once rushes through the perforations of the crate and its inner perforated cylinder, immersing the dishes, knives, forks, and spoons.

The lid is put on the kettle, the crank applied to the pin of the crate, and turned swiftly for about three minutes.

The hot water, and its friction against the plates, knives, forks, and spoons, as they revolve swiftly through it, will clean them thoroughly.

The crank and the lid of the kettle are again removed, the crate lifted out of it, and left to drain for a minute, when it may be placed on a hot stove for a little while, to dry the plates, &c.

These can then be taken out, and put in their proper places without undergoing a wiping.

What I claim as my invention, and desire to secure by Letters Patent, is—

The kettle A, crate C, and perforated cylinder D, when combined, arranged, and operated as and for the purpose specified.

In testimony that I claim the above-described machine for washing dishes, knives, forks, and spoons, I have hereunto signed my name, this 23d day of February, 1869.

CHARLES M. LELAND.

Witnesses:
P. C. JOHNSON,
J. N. WILCOXEN.